(12) United States Patent
Yu et al.

(10) Patent No.: US 7,969,927 B2
(45) Date of Patent: Jun. 28, 2011

(54) APPARATUS AND METHOD FOR EFFICIENT RESOURCE ALLOCATION USING COGNITIVE RADIO COMMUNICATION IN ORTHOGONAL FREQUENCY DIVISION MULTIPLE ACCESS (OFDMA)-BASED MOVING NETWORKS

(75) Inventors: Tak-Ki Yu, Yongin-si (KR); Eun-Seok Ko, Seongnam-si (KR); Yu-Seok Kim, Seoul (KR); You-Kyung Oh, Daejeon (KR); Yong-Hoon Lee, Daejeon (KR); Woo-Seok Nam, Daejeon (KR); Won-Yong Shin, Daejeon (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 90 days.

(21) Appl. No.: 12/384,335

(22) Filed: Apr. 2, 2009

(65) Prior Publication Data

US 2009/0252051 A1 Oct. 8, 2009

(30) Foreign Application Priority Data

Apr. 2, 2008 (KR) .................. 10-2008-0030677

(51) Int. Cl.
*H04B 7/14* (2006.01)
(52) U.S. Cl. ..................................... 370/315; 370/342

(58) Field of Classification Search .................. 370/478, 370/355; 455/452.1, 453
See application file for complete search history.

(56) References Cited

U.S. PATENT DOCUMENTS

| 7,558,255 B2* | 7/2009 | Vasudevan ..................... 370/355 |
| 2002/0147022 A1* | 10/2002 | Subramanian et al. ........ 455/453 |
| 2004/0253962 A1* | 12/2004 | Ganti et al. ................. 455/452.1 |
| 2008/0095195 A1* | 4/2008 | Ahmadi et al. ............... 370/478 |

* cited by examiner

*Primary Examiner* — Kwang B Yao
*Assistant Examiner* — Syed M Bokhari

(57) ABSTRACT

An apparatus and a method for efficient resource allocation using a cognitive radio communication in Orthogonal Frequency Division Multiple Access (OFDMA)-based moving networks are provided. The method includes determining a minimum transmit power value of the MRS, which enables the internal terminal to have a receive Signal to Interference and Noise Ratio (SINR) greater than a first threshold; determining a transmit power value of the MRS by taking into account the determined minimum transmit power value; determining a transmit power value of the MRS per cellular terminal, which is transmittable at maximum while exerting interference less than a second threshold on a corresponding cellular terminal; searching one or more cellular terminals having the maximum transmittable transmit power value determined per cellular terminal greater than the determined transmit power value; and borrowing and allocating a resource allocated to the searched cellular terminal to the internal terminal.

14 Claims, 11 Drawing Sheets

APPARATUS AND METHOD FOR EFFICIENT RESOURCE ALLOCATION USING COGNITIVE RADIO COMMUNICATION IN ORTHOGONAL FREQUENCY DIVISION MULTIPLE ACCESS (OFDMA)-BASED MOVING NETWORKS

CROSS-REFERENCE TO RELATED APPLICATION(S) AND CLAIM OF PRIORITY

The present application claims priority under 35 U.S.C. §119(a) to a Korean patent application filed in the Korean Intellectual Property Office on Apr. 2, 2008 and assigned Serial No. 10-2008-0030677, the entire disclosure of which is hereby incorporated by reference.

TECHNICAL FIELD OF THE INVENTION

The present invention relates generally to an apparatus and a method for efficient resource allocation using a cognitive radio communication in Orthogonal Frequency Division Multiple Access (OFDMA)-based moving networks. More particularly, the present invention relates to an apparatus and a method for efficient resource allocation for a link between a Mobile Relay Station (MRS) and an internal terminal in an environment where a cellular system and an MRS based system coexist.

BACKGROUND OF THE INVENTION

To service users who get on a mobile vehicle such as a bus, a train, and a cruise ship, standards are recently considering a scenario that installs a Mobile Relay Station (MRS) in the vehicle to enable a Base Station (BS) or a fixed relay station to communicate with a terminal of the user via the MRS.

A first feature of the MRS based system is mobility. In this respect, techniques relating to the mobility management such as handover have been suggested, and researches are mostly conducted on a resource allocation based on the MRS mobility as the number of the MRSs within a cell increases. When a cellular system of the direct communication without the RS and the MRS based system coexist within a large cell, a conventional method proposes that the two systems divide and use resources in the same frequency band. In so doing, fundamentally, the resources are divided to be orthogonal to each other in time or in frequency.

Another feature of the MRS based system is economy of the power. A distance between the MRS installed in the mobile vehicle and the internal terminals is much shorter than a distance between the BS or the fixed RS and the terminals in the mobile vehicle. Accordingly, when an antenna for the MRS is installed in the mobile vehicle and the seamless communication between the BS and the MRS is feasible, the MRS can service the internal terminals with the little transmit power and with little interference to outside.

Up to the present, researches are primarily applied to the resource allocation method based on the mobility of the MRS and particular consideration is not given to the channel characteristic between the MRS and the internal terminal. Further, in the large cell including both of the cellular system and the MRS based system, when the number of the MRSs increases, what is needed is a method other than a method for allowing the two systems to divide and use the resources in the same frequency band.

SUMMARY OF THE INVENTION

To address the above-discussed deficiencies of the prior art, it is a primary aspect of the present invention is to address at least the above mentioned problems and/or disadvantages and to provide at least the advantages described below. Accordingly, an aspect of the present invention is to provide an apparatus and a method for efficient resource allocation using a cognitive radio communication in OFDMA-based moving networks.

Another aspect of the present invention is to provide an apparatus and a method for efficient resource allocation for a link between a Mobile Relay Station (MRS) and an internal terminal in an environment including both a cellular system and an MRS based system.

Yet another aspect of the present invention is to provide an apparatus and a method for selecting a priority terminal to share resource with a second priority terminal by determining an interference magnitude on the priority terminal affected by the MRS and an average data rate obtainable by borrowing and allocating the resource of the priority terminal to the second priority terminal in an environment including both of a cellular system and an MRS based system, and a frame structure supporting the apparatus and the method.

Still another aspect of the present invention is to provide an apparatus and a method for selecting a priority terminal to borrow and allocate resource to a second priority terminal by determining a transmit power value of an MRS enough to guarantee a Quality of Service (QoS) greater than a threshold to the second priority terminal and a maximum transmit power value of the MRS that exerts interference less than a threshold on a corresponding priority terminal per priority terminal, and determining a transmit power of the MRS using the two determined transmit power values when the resource of the priority terminal is borrowed and allocated to the second priority terminal in an environment including both of a cellular system and an MRS based system.

The above aspects are achieved by providing a resource allocation method for an internal terminal of an MRS in an environment where a cellular system and an MRS based system coexist, includes determining a minimum transmit power value of the MRS, which enables the internal terminal to have a receive Signal to Interference and Noise Ratio (SINR) greater than a first threshold; determining a transmit power value of the MRS by taking into account the determined minimum transmit power value; determining a transmit power value of the MRS per cellular terminal, which is transmittable at maximum while exerting interference less than a second threshold on a corresponding cellular terminal; searching one or more cellular terminals having the maximum transmittable transmit power value determined per cellular terminal greater than the transmit power value determined by taking into account the minimum transmit power value; and borrowing and allocating a resource allocated to the searched cellular terminal to the internal terminal.

According to one aspect of the present invention, a resource allocation apparatus for an internal terminal of an MRS in an environment where a cellular system and an MRS based system coexist, includes a cellular terminal selector for determining a minimum transmit power value of the MRS, which assists the internal terminal to have a receive SINR greater than a first threshold, determining a transmit power value of the MRS by taking into account the determined minimum transmit power value, determining a transmit power value of the MRS per cellular terminal, which is transmittable at maximum while exerting interference less than a second threshold on a corresponding cellular terminal, and searching one or more cellular terminals having the maximum transmittable transmit power value determined per cellular terminal greater than the transmit power value determined by taking into account the minimum transmit power value; and a MAP generator for borrowing and allocating a resource allocated to the searched cellular terminal to the internal terminal.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

Figure 1A:
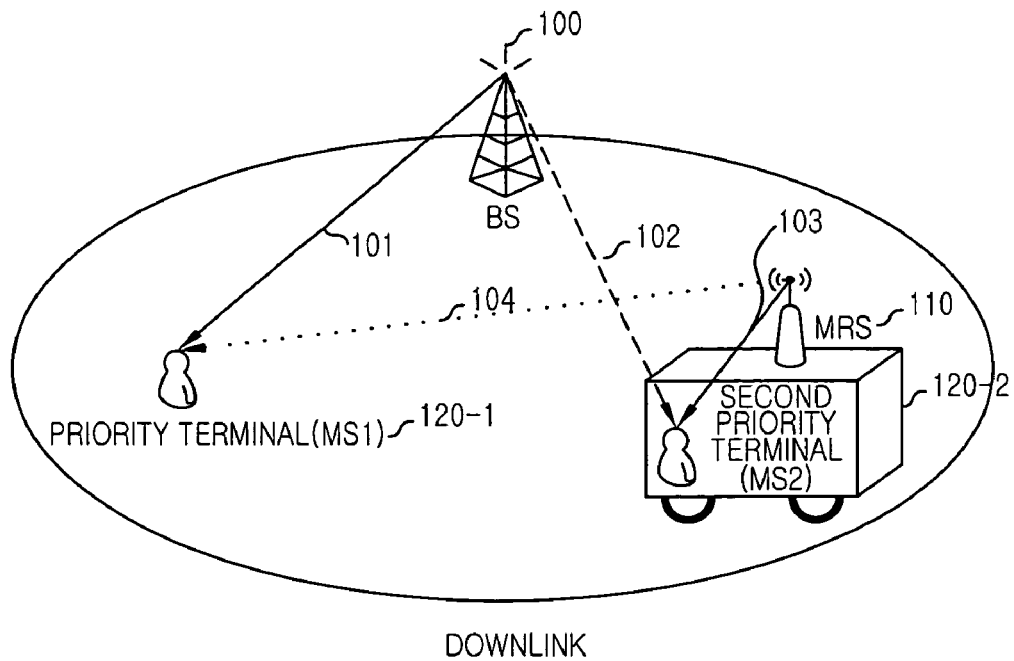
FIGS. 1A and 1B illustrate system models in consideration of a link between an MRS and an MS2 in an environment including both of a TDD OFDMA based cellular system and an MRS based system according to an exemplary embodiment of the present invention.

FIGS. 1A through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide an apparatus and a method for efficient resource allocation for a link between an MRS and an internal terminal in a large cell including both of a Time-Division Duplex (TDD) OFDMA based cellular system and an MRS based system.

To address problems caused by exhaustion of resources, cognitive radio communication is attracting much attention. For the efficient utilization of the frequencies, the cognitive radio communication senses an unused time or channel of a priority user, borrows and allocates the unused time or channel to a second priority user so that the second priority user can communicate using the same resource as the priority user without additional frequency allocation. The present invention provides a scenario and a frame structure for allowing an internal terminal serviced by the MRS to share and use the resource allocated to a cellular terminal for the sake of the efficient resource allocation for the link between the MRS and the internal terminal. More particularly, the present invention provides a method for selecting the priority terminal to share the resource with the second priority terminal by determining interference magnitude on the priority terminal affected by the MRS and an average data rate obtainable by borrowing and allocating the resource of the priority terminal to the second priority terminal, and a frame structure for supporting the method.

The conventional cognitive radio communication needs to keep sensing the unused time or channel of the priority user. By contrast, when the present invention adopts the OFDMA system based on the Institute of Electrical and Electronics Engineers (IEEE) 802.16e or 802.16j, a base station can provide information relating the resource to be used by the priority terminal using MAP information. Thus, until the information is updated according to the elapse of the time, the second priority terminal can periodically communicate using the initially determined resource of the priority terminal.

The priority terminal (hereafter, referred to as a Mobile Station (MS)1) indicates the terminal directly serviced by the base station, and the second priority terminal (hereafter, referred to as an MS2) indicates the terminal serviced by the MRS within the MRS. While an average Signal to Noise Ratio (SNR) is measured for a long term by taking into account the distance reduction and the shadowing, the present invention considers only the effect of the distance reduction. Since the cellular system is the TDD system in the exemplary embodiment of the present invention, it is assumed that an uplink and a downlink are symmetric to each other.

A channel between the Base Station (BS) and an MS i is $h_{B,M_i}$, a channel between the BS and an MRS j is $h_{B,R_j}$, and a channel between the MRS j and the MS i is $h_{R_j,M_i}$. A transmit power of the MRS j is $P_{t,R_j}$, a transmit power of the MS i is $P_{t,M_i}$, and a transmit power of the BS is $P_{t,B}$. Receive signal magnitudes from the BS and the MRS j to the MS i are $P_{r,B M_i}$ and $P_{r,R_j M_i}$, receive signal magnitudes from the MS i and the MRS j to the BS are $P_{r,M_i B}$ and $P_{r,R_j B}$, and receive signal magnitudes from the BS and the MS i to the MRS j are $P_{r,B R_j}$ and $P_{r,M_i R_j}$. $N_o$ denotes a noise signal magnitude at each receiver. When the MS2 borrows the resource of the MS1, it is assumed that the MS1 permits an average interference power received from the MS2 up to a threshold Q.

Figure 1B:
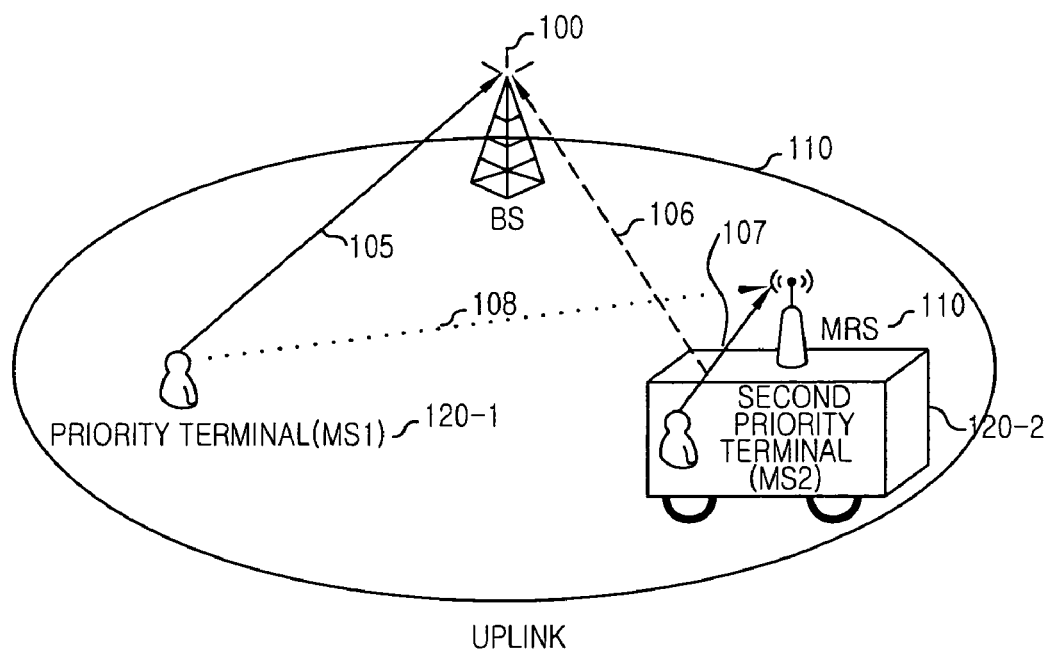

FIGS. 1A and 1B illustrate system models in consideration of the link between the MRS and the MS2 in an environment including both of a TDD OFDMA based cellular system and an MRS based system according to an exemplary embodiment of the present invention.

It is assumed that a cell includes a BS 100, at least one MRS 110, at least one MS1 120-1 communicating with the BS 100 in one hop, and at least one MS2 120-2 communicating with the BS 100 via the MRS 110 in two hops. The MRS 110 decodes and relays signals between the BS 100 and the MS2 120-2. The MRS 110 generates the signal received from the BS 100 for the MRS-MS2 link by decoding and encoding the received signal and then transmits the generated signal to the MS2 120-2. The MRS 110 generates the signal received from the MS2 120-2 for the MRS-BS link and transmits the generated signal to the BS 100. The MRS 110 is assumed to conduct a half-duplex communication unless the transmission and the reception are performed at the same time.

In the downlink of FIG. 1A, when the MS1 120-1 is close to the MRS 110, the signal 103 transmitted from the MRS 110 to the MS2 120-2 can act as the interference 104 to the MS1 120-1. When the MRS 110 is close to the BS 100, the signal 101 transmitted from the BS 100 to the MS1 120-1 can act as the interference 102 to the MS2 120-2 serviced by the MRS 110. In the uplink of FIG. 1B, when the MS1 120-1 is close to the MRS 110, the signal 105 transmitted from the MS1 120-1 to the BS 100 can act as the interference 108 to the MRS 110. When the MRS 110 is close to the BS 100, the signal 107 transmitted from the MS2 120-2 to the MRS 110 can act as the interference 106 to the BS 100.

Accordingly, when the MRS 110 borrows and allocates the resource of the MS1 120-1 to the MS2 120-2, the MRS 110 should be suitably away from the BS 100 and the MRS 110 needs to search the MS1 120-1 apart from the MRS 110 and transmit information of the searched MS1 120-1 to the BS 100. When the BS 100 approves the borrowing and allocation of the resource of the MS1 120-1 to the MS2 120-2, the MRS 110 can borrow and allocate the resource of the MS1 120-1 to the MS2 120-2. Thus, the resource can be efficiently utilized with the little interference to each other. To this end, the present invention provides a method for selecting the MS1 120-1 to borrow and allocate the resource to the MS2 120-2 by determining the magnitude of the interference applied by the MRS 110 to the MS 1 120-1 and the average data rate of the MS2 120-2 obtainable by borrowing and allocating the resource of the MS 1 120-1 to the MS2 120-2 in the downlink.

The present method is applicable to the uplink. In what follows, descriptions focus on the downlink.

Figure 2:
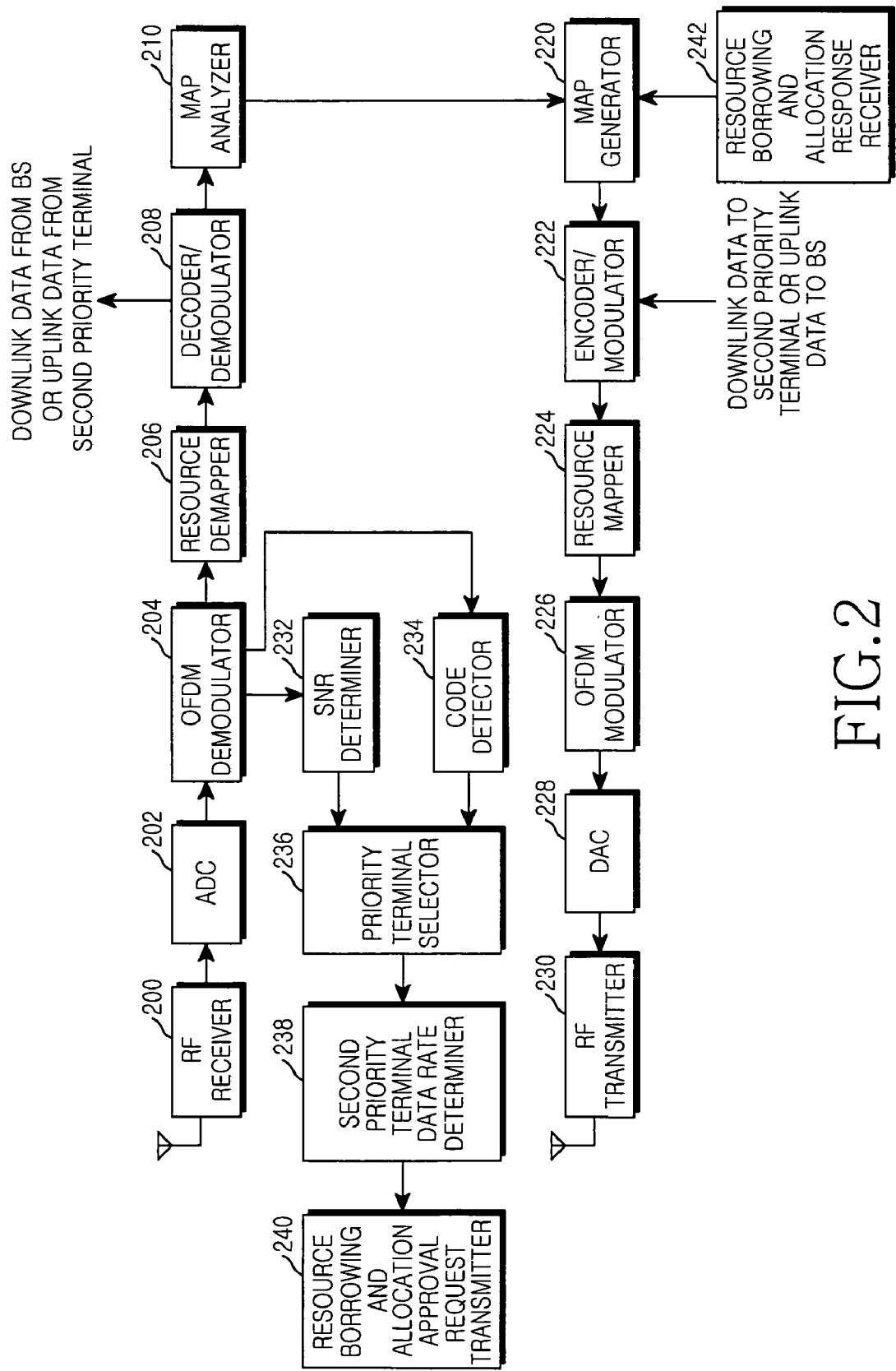
FIG. 2 illustrates a transmitter and a receiver of the MRS according to an exemplary embodiment of the present invention.

FIG. 2 illustrates a block diagram of a transmitter and a receiver of the MRS according to an exemplary embodiment of the present invention.

The MRS of FIG. 2 includes a Radio Frequency (RF) receiver 200, an Analog to Digital Converter (ADC) 202, an Orthogonal Frequency Division Multiplexing (OFDM) demodulator 204, a resource demapper 206, a decoder/demodulator 208, a MAP analyzer 210, a MAP generator 220, an encoder/modulator 222, a resource mapper 224, an OFDM modulator 226, a Digital to Analog Converter (DAC) 228, an RF transmitter 230, an SNR determiner 232, a code detector 234, a priority terminal selector 236, a second priority terminal data rate determiner 238, a resource borrowing and allocation approval request transmitter 240, and a resource borrowing and allocation response receiver 242.

The RF receiver 200 converts an RF signal received over an antenna to a baseband signal. The ADC 202 converts the baseband analog signal output from the RF receiver 200 to digital sample data. The OFDM demodulator 204 outputs subcarrier values by OFDM-demodulating the sample data output from the ADC 202. Herein, the OFDM demodulation includes a Cyclic Prefix (CP) elimination, Fast Fourier Transform (FFT) operation, and so on. In addition to the typical function, the OFDM demodulator 204 detects a signal transmitted from the MS1 to the BS in the uplink and outputs the detected signal to the SNR determiner 232 and the code detector 234. The resource demapper 206 extracts MAP and downlink data from the BS or uplink data from the MS2, which are received in a preset region of the frame, from the data output from the OFDM demodulator 204. The decoder/demodulator 208 outputs the MAP and the downlink data or the uplink data by demodulating and decoding the data output from the resource demapper 206 using a preset scheme. The MAP analyzer 210 analyzes the MAP output from the decoder/demodulator 208 and controls the transmission and the reception of the MRS according to the MAP in general.

The MAP generator 220 schedules the resources for the MS2s and generates MAP using the scheduling result. The MAP includes resource allocation information transmitted to the MS2s. Based on the scheduling result, the MAP generator 220 controls the transmission and the reception of the MRS in general. The encoder/modulator 222 encodes and modulates the uplink data to the BS or the downlink data to the MS2 and the MAP output from the MAP generator 220 using a preset scheme. The resource mapper 224 maps the data output from the encoder/modulator 222 to preset resources. The OFDM modulator 226 OFDM-modulates the data mapped by the resource mapper 224. Herein, the OFDM modulation includes CP insertion, Inverse FFT (IFFT) operation, and so on. The DAC 228 converts the sample data output from the OFDM modulator 226 to an analog signal. The RF transmitter 230 converts the baseband signal output from the DAC 228 to an RF signal and transmits the RF signal over an antenna.

The SNR determiner 232 receives the signal transmitted from the MS1 to the BS in the uplink, from the OFDM demodulator 204, estimates a channel using a pilot symbol of the received signal, and determines an uplink receive SNR of the MS1 using the estimated channel.

The code detector 234 receives the signal transmitted from the MS1 to the BS in the uplink, from the OFDM demodulator 204, extracts codes at a preset position of the subcarrier of the received signal, and detects a code of the highest correlation as a code of the corresponding receive signal by correlating the extracted codes. Herein, the code is selected based on the transmit power magnitude of the MS1. Alternatively, all the codes are divided into a plurality of groups based on the transmit power. Next, when the MS1 selects the code based on the transmit power magnitude and transmits the code to the MRS in the uplink registration message transmission of the uplink registration interval, the MRS can detect the code in the uplink registration interval. Alternatively, when the MS1 transmits the uplink data, the MRS may detect the code by receiving the code indicative of the transmit power over the control channel, or by assuming that each MS1 transmits the data with a minimum transmit power.

The priority terminal selector 236 determines the transmit power of the corresponding MS1 using the detected code and selects the MS1 that will lend and allocate its resource to the MS2 using the determined transmit power of the MS1 and the uplink receiver SNR. More specifically, the priority terminal selector 236 determines the transmit power value of the MRS capable of guaranteeing the QoS greater than the threshold to the MS2 and the maximum transmit power value of the MRS per MS1 with the interference less than the threshold on the corresponding MS1, determines the transmit power of the MRS using the two determined transmit power values, and thus selects the MS1 for lending and allocating the resource to the MS2.

The second priority terminal data rate determiner 238 determines the average data rate that can be obtained by borrowing and allocating the resource of the selected MS1 to the MS2.

The resource borrowing and allocation approval request transmitter 240 requests the borrowing and allocation approval of the resource of the MS1 to the MS2 by feeding back an Identifier (ID) of the selected MS1 and the determined average data rate of the MS2.

The resource borrowing and allocation response receiver 242 receives a response for the borrowing and allocation approval request of the resource of the MS1 to the MS2, from the BS. When the response is an ACK response that approves the borrowing and the allocation of the resource of the corresponding MS1 to the MS2, the resource borrowing and allocation response receiver 242 controls the MAP generator 220 to locate the resource allocated from the BS to the selected MS1 based on the MAP analyzed by the MAP analyzer 210, to borrow and allocate the resource of the searched MS1 to the MS2, to generate the MAP including the position of the resource borrowed and allocated to the MS2, and to output the generated MAP to the encoder/modulator 222. Hence, the MRS can send the downlink data to the MS2 using the borrowed and allocated resource.

Figure 3:
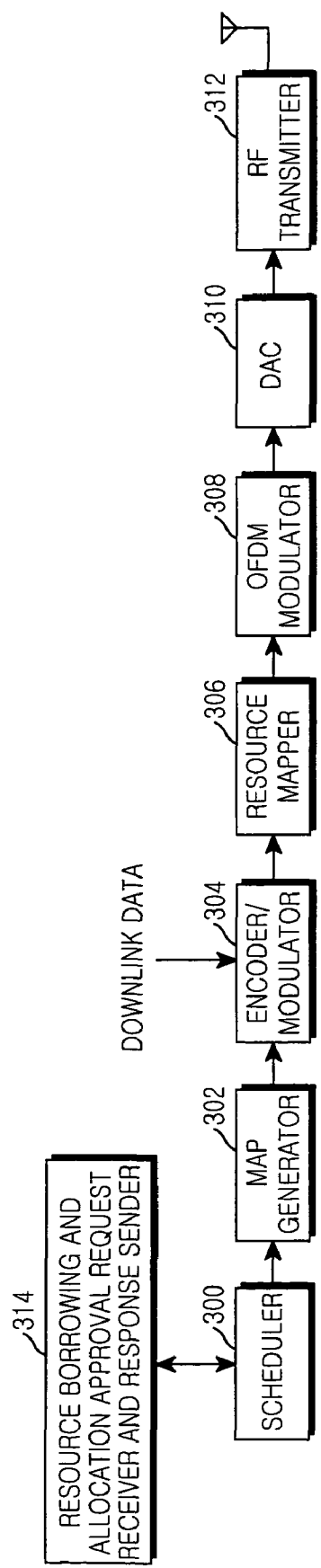
FIG. 3 illustrates a transmitter of a BS according to an exemplary embodiment of the present invention.

FIG. 3 is a block diagram of a transmitter of the BS according to an exemplary embodiment of the present invention.

The BS of FIG. 3 includes a scheduler 300, a MAP generator 302, an encoder/modulator 304, a resource mapper 306, an OFDM modulator 308, a DAC 310, an RF transmitter 312, and a resource borrowing and allocation approval request receiver and response sender 314.

The scheduler 300 schedules the resources for the MS1 and the MRS and provides the scheduling result to the MAP generator 302. Based on the scheduling result, the scheduler 300 controls the overall transmission and reception of the BS. The MAP generator 302 generates MAP using the scheduling result provided from the scheduler 300. The MAP includes resource allocation information transmitted to the MS1 and the MRS. The encoder/modulator 304 encodes and modulates downlink data and the MAP output from the MAP generator 302 according to a preset scheme. The resource mapper 306 maps the data output from the encoder/modulator 304 to preset resources. The OFDM modulator 308 produces OFDM symbols by OFDM-modulating the data mapped by the resource mapper 306. Herein, the OFDM modulation includes the IFFT operation, the CP insertion, and so on. The DAC 310 converts the sample data output from the OFDM modulator 308 to an analog signal. The RF transmitter 312 converts the baseband signal output from the DAC 310 to an RF signal and transmits the RF signal over an antenna.

The resource borrowing and allocation approval request receiver and response sender 314 receives the borrowing and allocation approval request relating to the resource of the MS1 selected by the MRS to the MS2, from the MRS and outputs the ID of the selected MS1 and the average data rate of the MS2 contained in the request, to the scheduler 300. The scheduler 300 determines whether it is possible to borrow and allocate the resource of the MS1 to the MS2 using the ID of the MS1 and the average data rate of the MS2, generates an ACK response to inform the MRS of the approval of the borrowing and the allocation of the resource of the corresponding MS1 to the MS2 or a response to inform of the disapproval of the borrow and allocation based on the determination, and outputs the generated response to the resource borrowing and allocation approval request receiver and response sender 314. The resource borrowing and allocation approval request receiver and response sender 314 transmits the response to the MRS.

Figure 4:
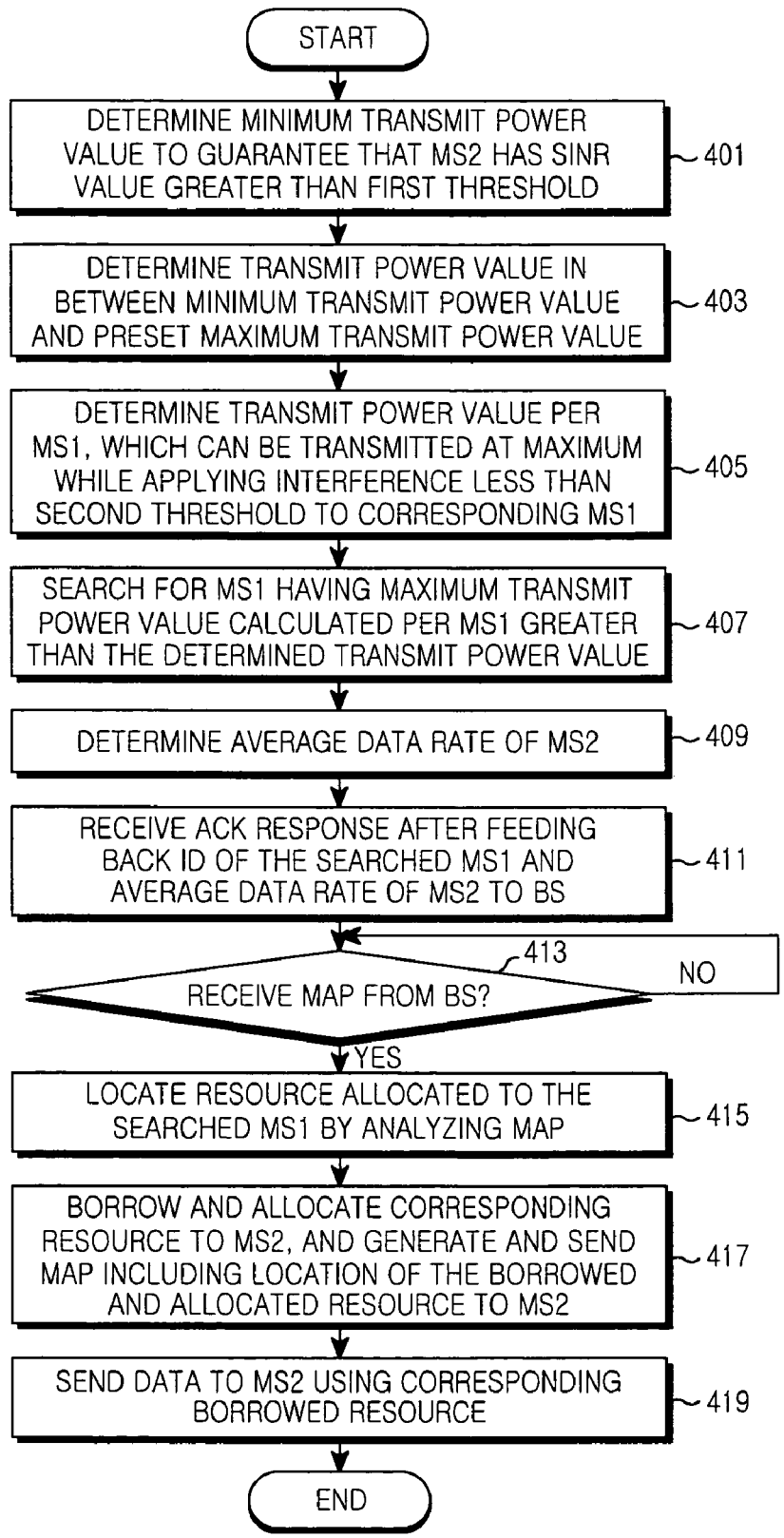
FIG. 4 illustrates a method for the MRS to borrow and allocate a downlink resource of MS1 to MS2 in the environment including both of the TDD OFDMA based cellular system and the MRS based system according to an exemplary embodiment of the present invention.

FIG. 4 illustrates a method for the MRS to borrow and allocate the downlink resource of the MS1 to the MS2 in the environment including both of the TDD OFDMA based cellular system and the MRS based system according to an exemplary embodiment of the present invention.

In step 401, the MRS determines the minimum transmit power value $P_{t,R,min}$ of the MRS enables the receive Signal to Interference and Noise Ratio (SINR) of the MS2 greater than a first threshold η dB. Herein, the MRS can determine the receive signal magnitude $P_{r,BM2}$ from the BS to the MS2 by measuring the average SNR of the signal received from the BS at the current location or computing the effect of the distance reduction according to a distance $d_{B-R}$ from the BS, and determine the minimum transmit power value $P_{t,R,min}$ that enables the MRS to have the SINR greater than the first threshold η dB. Alternatively, the MRS may obtain the minimum transmit power value $P_{t,R,min}$ by retrieving the minimum transmit power value $P_{t,R,min}$ mapped to the distance $d_{B-R}$ to the base station in a mapping table.

In step 403, the MRS determines the transmit power value in between the determined minimum transmit power value $P_{t,R,min}$ and $P_{t,R,max}$ that is preset by the MRS to the maximum possible transmit power value of the MRS.

In step 405, the MRS determines its transmit power value $P_{t,R-M1}$ per MS1, which can be transmitted at maximum while applying the interference less than a second threshold Q to the corresponding MS1. Herein, Q denotes an interference allowance satisfying a condition $0 \leq Q \leq 1$. The maximum transmit power value $P_{t,R-M1}$ of the MRS per MS1 does not exceed $P_{r,R,max}$ that is preset to the maximum possible transmit power value of the MRS as expressed in Equation 1:

$$P_{t,R-M1} \leq \min\left\{\frac{P_{t,M1}}{SNR_{r,M1R}}Q, P_{t,R,max}\right\} \quad \text{[Eqn. 1]}$$

Figure 6A:
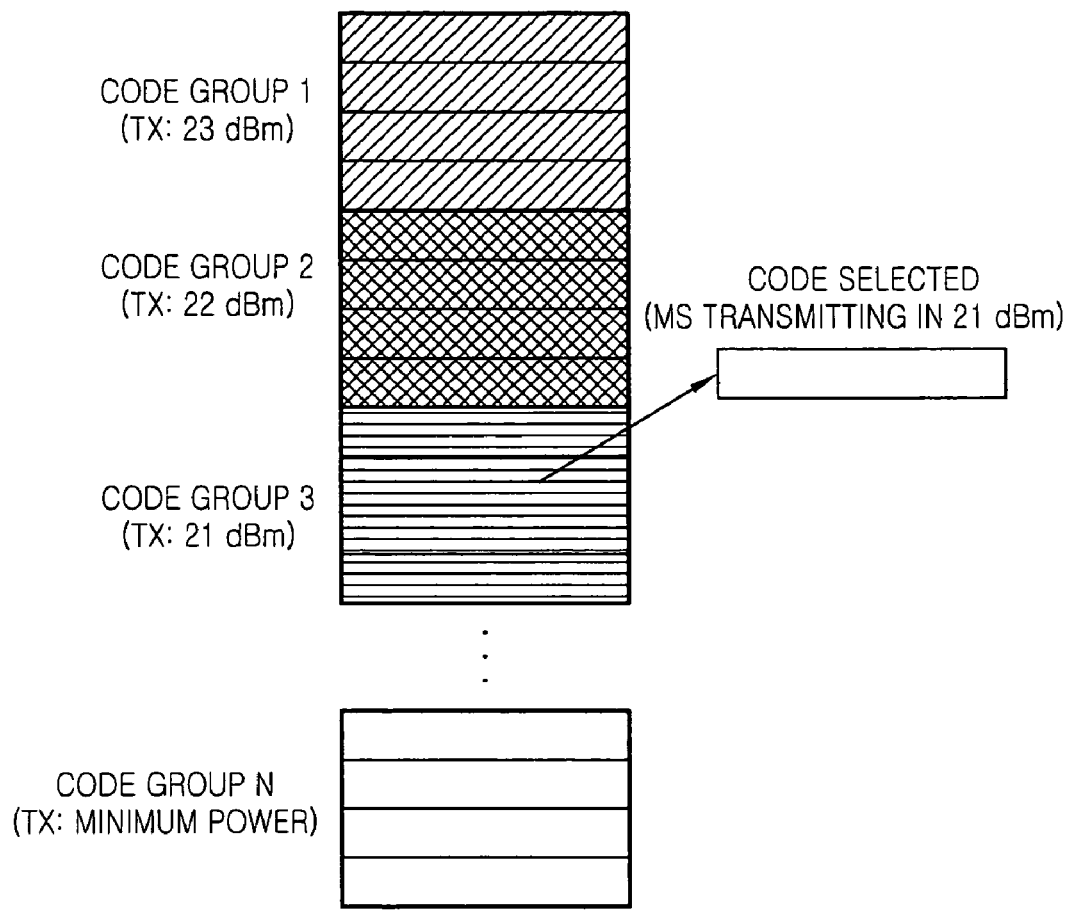
FIGS. 6A and 6B illustrate a transmit power determination through a code detection of a receive signal at the MRS according to an exemplary embodiment of the present invention.
Figure 6B:
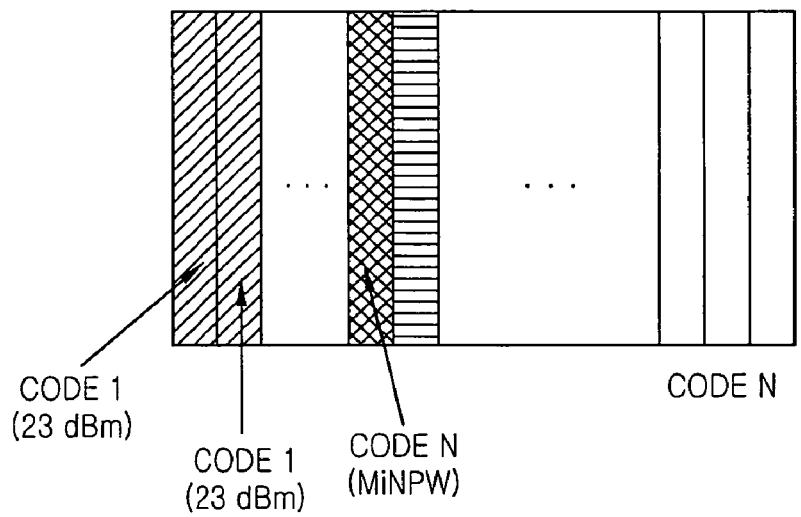

In Equation 1, $SNR_{r,M1R}$ denotes the uplink receive SNR of the MS1, which is determined by detecting the signal transmitted from the MS1 to the BS in the uplink. $P_{t,M1}$ denotes the transmit power magnitude of the MS1, which can be determined in various manners as shown in FIGS. 6A and 6B. The first manner relates to a case where the MS1 newly communicates with the MRS through the uplink registration procedure. In FIG. 6A, all the codes are divided into a plurality of groups based on the transmit power, the MS1 selects the code based on the transmit power magnitude and sends the code to the MRS in the uplink registration message transmission over the uplink registration interval, and the MRS detects the code in the uplink registration interval. According to the second manner, the MS1 sends the code indicative of the transmit power to the MRS over a control channel in the uplink data transmission as shown in FIG. 6B. In the third manner, the MRS assumes that each MS1 transmits with the minimum transmit power. The last manner detects the code applied to the signal by sensing the signal transmitted from the MS1 to the base station in the uplink. Herein, the code is the code selected based on the transmit power magnitude of the MS1.

In step 407, the MRS searches for the MS1 having the maximum transmit power value greater than the determined transmit power value by comparing the maximum transmit power value $P_{t,R-M1}$ of the MRS determined per MS1 with the transmit power value determined in step 403.

Herein, the maximum transmit power value of the searched MS1 meets the condition of Equation 2 in step 403.

$$\frac{P_{t,M1}}{SNR_{r,M1R}} Q \geq P_{t,R,min} \quad [\text{Eqn. 2}]$$

In step 409, the MRS determines the average data rate obtainable by borrowing and allocating the resource of the searched MS1 to the MS2. Herein, the average data rate obtainable by the MS2 can be computed based on Equation 3:

$$R_2 = E\left[\log_2\left(1 + \frac{|h_{RM2}|^2 P_{r,RM2}/N_o}{|h_{BM2}|^2 P_{r,BM2}/N_o + 1}\right)\right] \quad [\text{Eqn. 3}]$$
$$= E\left[\log_2\left(1 + \frac{SNR_{r,RM2}}{SNR_{r,BM2} + 1}\right)\right]$$

In Equation 3, $h_{BM2}$ can be fed back from the MS2, or measure and utilize $h_{BR}$ as $h_{BM2}$ on the assumption that $h_{BR}$ and $h_{BM2}$ are alike.

In step 411, the MRS feeds back the ID the MS1 searched in step 407 and the determined average data rate of the MS2 to the BS and then receives an ACK response from the BS. In the following, descriptions provide a case where the MRS receives the ACK response that approves the borrowing and the allocation of the resource of the MS1 to the MS2, from the BS.

In step 413, the MRS examines whether the MAP is received from the BS. When receiving the MAP, the MRS locates the resource allocated to the searched MS1 by analyzing the received MAP in step 415. In step 417, the MRS borrows and allocates the resource allocated to the searched MS1 to the MS2, and generates and transmits the MAP including the location of the resource borrowed and allocated to the MS2, to the MS2. In step 419, the MRS transmits the downlink data to the MS2 using the borrowed and allocated resource.

Next, the MRS finishes this process.

Figure 5:
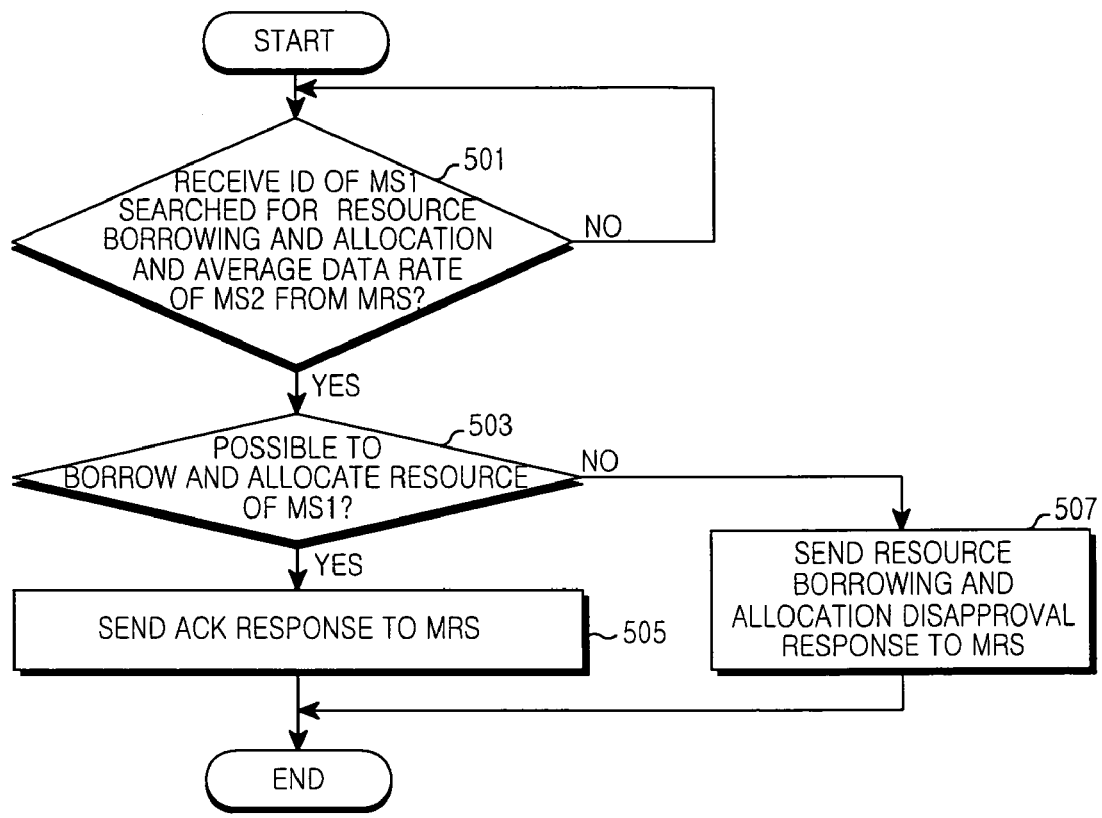
FIG. 5 illustrates a method for the BS to borrow and allocate the downlink resource of the MS1 to the MS2 according to a request of the MRS in the environment including both of the TDD OFDMA based cellular system and the MRS based system according to an exemplary embodiment of the present invention.

FIG. 5 illustrates a method for the BS to borrow and allocate the downlink resource of the MS1 to the MS2 according to the request of the MRS in the environment including both of the TDD OFDMA based cellular system and the MRS based system according to an exemplary embodiment of the present invention.

In step 501, the BS determines whether the ID of the MS1 searched for the resource borrowing and allocation and the average data rate of the MS2 obtainable by borrowing and allocating the resource of the searched MS1 to the MS2 are received from the MRS or not.

When receiving the ID of the MS1 and the average data rate of the MS2, the BS examines whether the resource of the MS1 can be lent and allocated to the MS2, using the received MS1 ID and the average data rate of the MS2 in step 503. For example, when the MS1 needs to be ensured with the high QoS, the BS can determine that it is impossible to borrow and allocate the resource of the MS1. When the resource of the MS1 can be lent and allocated to the MS2, the BS sends to the MRS the ACK response that approves the borrowing and the allocation of the resource of the corresponding MS1 to the MS2 in step 505. By contrast, when the resource of the MS1 cannot be lent and allocated to the MS2, the BS sends to the MRS a response informing of the impossible borrowing and allocation of the resource of the corresponding MS1 to the MS2 in step 507.

Next, the BS finishes this process.

FIGS. 7 through 10 illustrate TDD frame structures for the resource allocation according to an exemplary embodiment of the present invention.

In the TDD frame structure, the MRS enhances the quality by processing the received BS signal and retransmits the signal. Like the BS, the MRS transmits its preamble and the MAP. The MRS should be able to communicate at any location within the cell without interfering with the existing system. When the MAP is transmitted in the same frequency band as the BS at the same time, this interferes with the existing cellular MS1. Hence, the TDD frame structure of the present invention fundamentally considers an asynchronous broadcasting frame structure. Of the information contained in the MAP of the BS, the information relating to the resource allocated to the MRS indicates the next frame information. There are a case where the information relating to the resource allocated to the MS1, of the information contained in the MAP, can indicate the current frame information, and a case where the information relating to the resource allocated to the MS1 indicates the information after the frame $n(n \geq 1)$, which are explained respectively.

Figure 7:
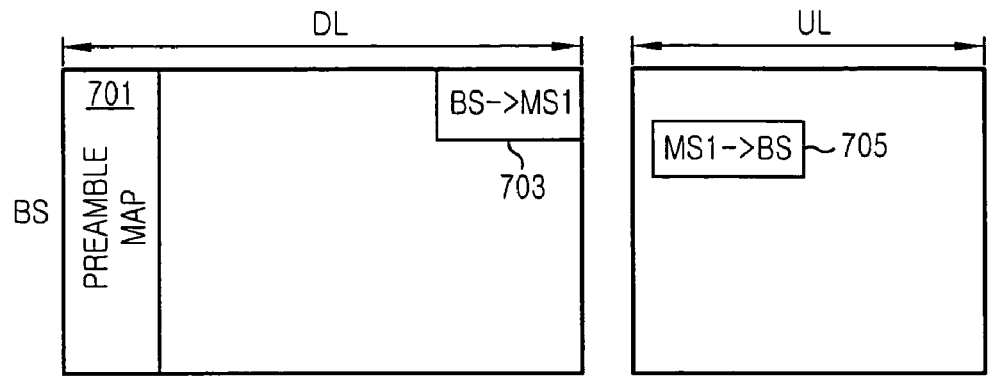
FIGS. 7 through 10 illustrate TDD frame structures for the resource allocation according to an exemplary embodiment of the present invention.
Figure 7:
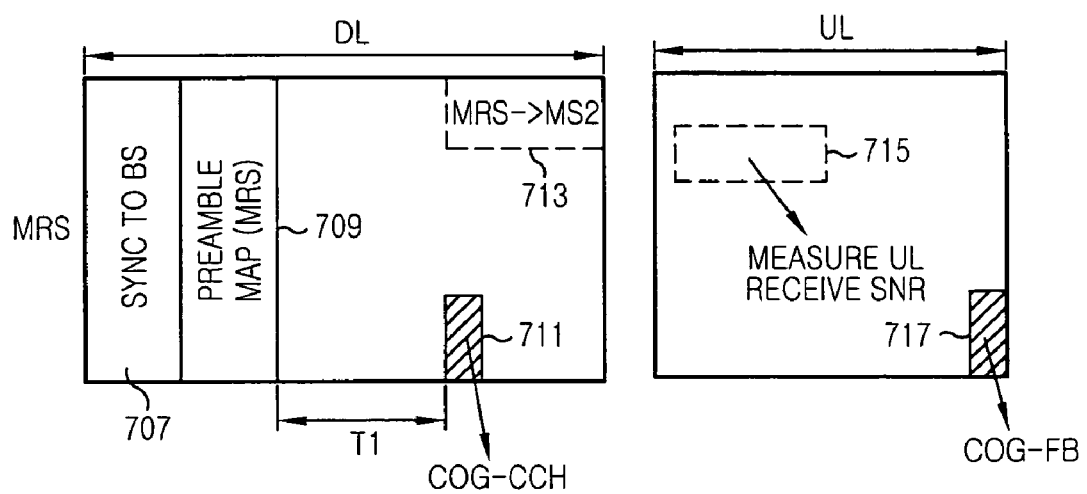
Figure 8:
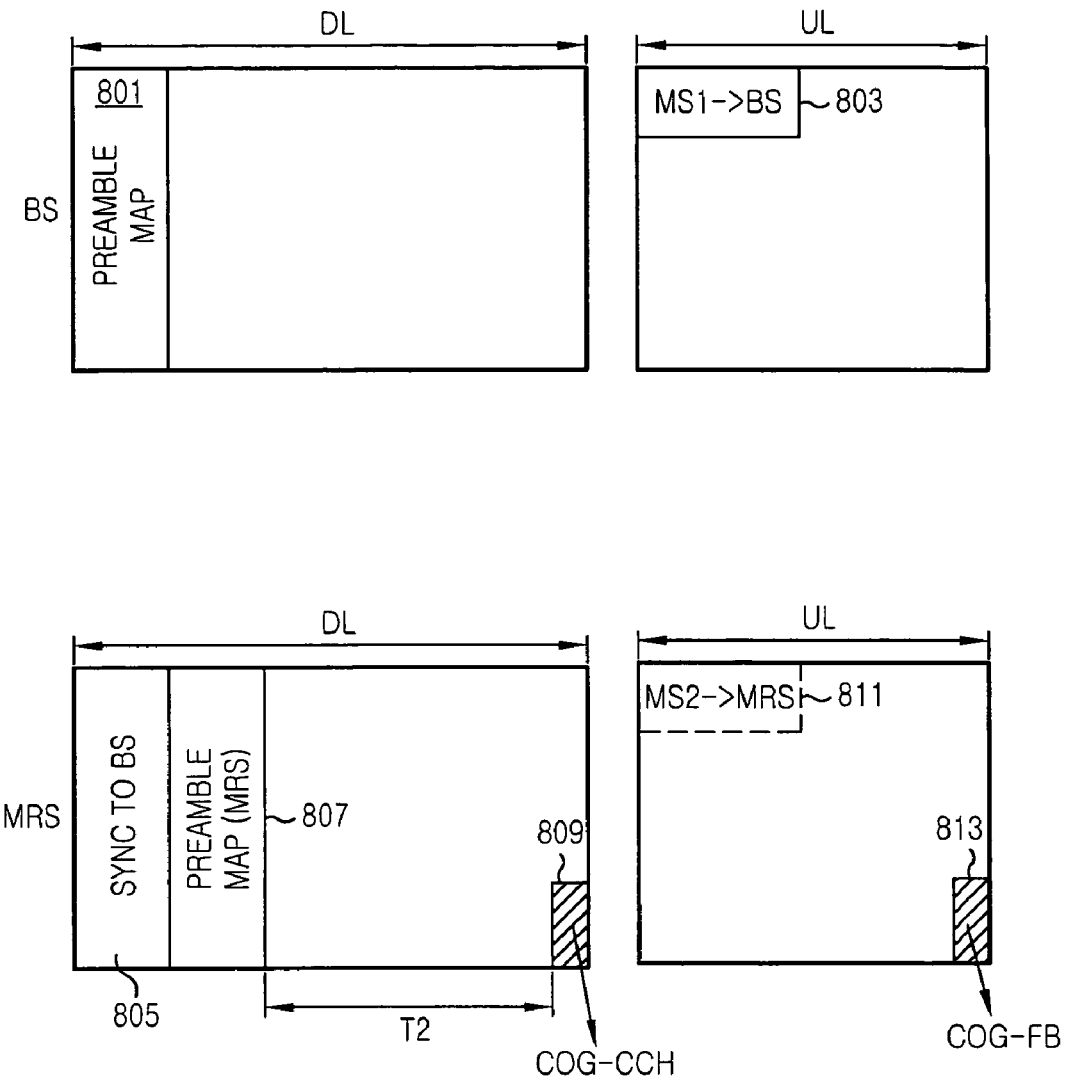

FIGS. 7 and 8 illustrate the frame structures for the resource allocation of the MRS→MS downlink and the MS→MRS uplink when the information relating to resource allocated to the MS1, of the information contained in the MAP, indicates the current frame information. In the frame structure for the downlink resource allocation of FIG. 7, the MRS measures the average receive SNR 715 of the MS1 using the signal 705 transmitted from the MS1 to the BS in the uplink interval and feeds back the ID of the searched MS1 and the average data rate obtainable by the MS2 over a COGnitive-FeedBack (COG-FB) control channel 717 according to the aforementioned scenario. The BS informs of the resource bundle for the MRS→MS link including the resource allocated to the MS1 through the downlink MAP 701 using the ID of the MS1 and the average data rate obtainable by the MS2. The MRS receives the downlink MAP 701 while synchronizing with the BS 707.

As the information relating to the resource allocated to the MRS of the information contained in the MAP 701 relates to the next frame, the MRS can generate the MRS MAP in advance by scheduling according to the MS2 link status. The MRS generates the MRS MAP in advance and transmits the generated MRS MAP 709. However, since the information relating to the resource allocated to the MS1 indicates the current frame information, the MRS needs to locate the downlink resource allocated to the MS1 using this information. For doing so, the MRS locates the resource allocated to the MS1 in the current frame by decoding the MAP of the BS during the time t1, and encodes in advance the data for the MS2s to which the resource allocated to the MS1 is to be lent and allotted to, according to the location. The MRS generates small MAP information for the MS2s to which the resource allocated to the MS1 is to be borrowed and allotted to, transmits the generated MAP information over a COG-Control CHannel (COG-CCH) 711, and transmits the data for the MS2s to which the resource allocated to the MS1 is to be borrowed and allotted to, using a data burst 713 of the same position as a data burst 703 corresponding to the MS1. In so doing, the BS ensures the time t1 required for the MRS by allocating the data burst 703 corresponding to the MS1 at the back of the downlink frame.

In the frame structure for the uplink resource allocation of FIG. 8, since there is no need to locate the MS1 using the MAP received from the BS and to send the data directly to the MS2 at the same position in the uplink resource allocation, the time t2 can be afforded, compared to FIG. 7.

Figure 9:
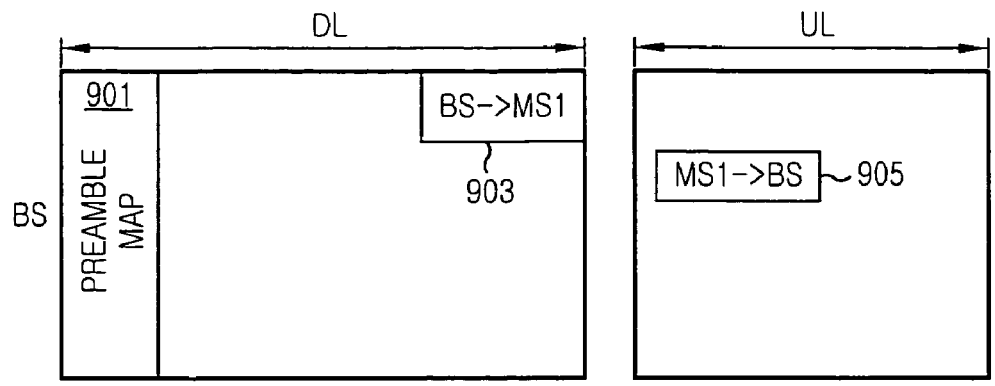
Figure 9:
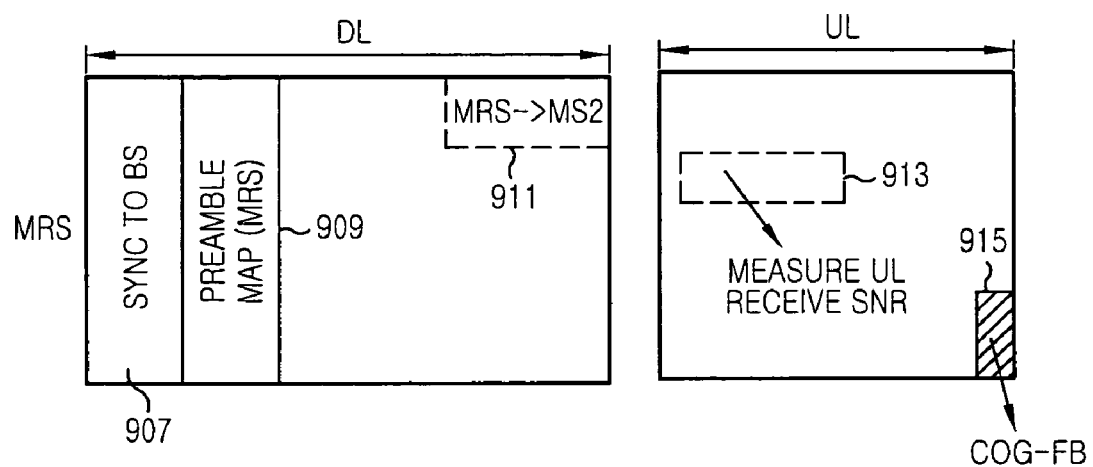
Figure 10:
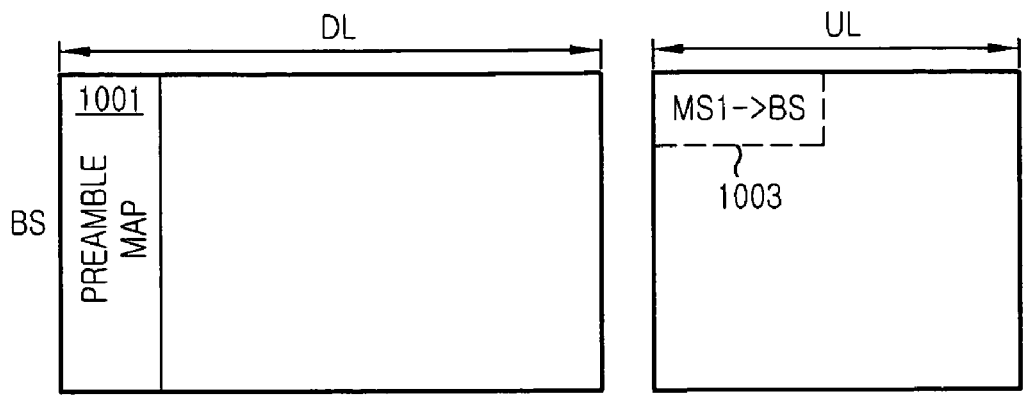
Figure 10:
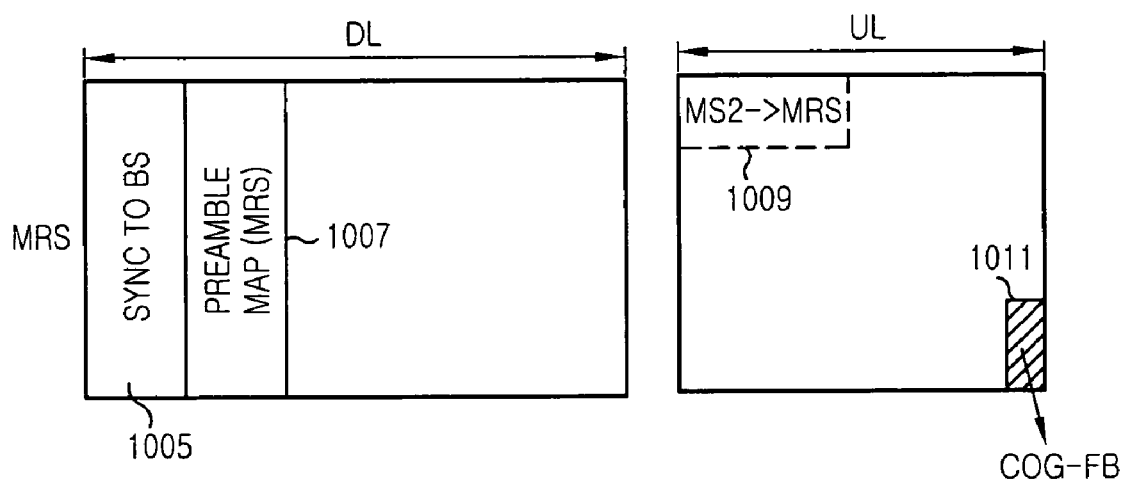

FIGS. 9 and 10 illustrate the frame structures for the MRS→MS downlink resource allocation and the MS→MRS uplink resource allocation when the information relating to the resource allocated to the MS1 of the information contained in the MAP indicates the information after the frame n(n≧1). Unlike FIGS. 7 and 8, since the MRS does not need to locate the MS1 using the MAP received from the BS and to send the data directly to the MS2 at the same position, the MRS can transmit the allocation information for the MS2s to which the resource allocated to the MS1 is to be borrowed and allocated to and the allocation information for the MS2s assigned the general resource, rather than the resource allocated to the MS1, at a time using the MRS MAP instead of the COG-CCH.

Figure 11:
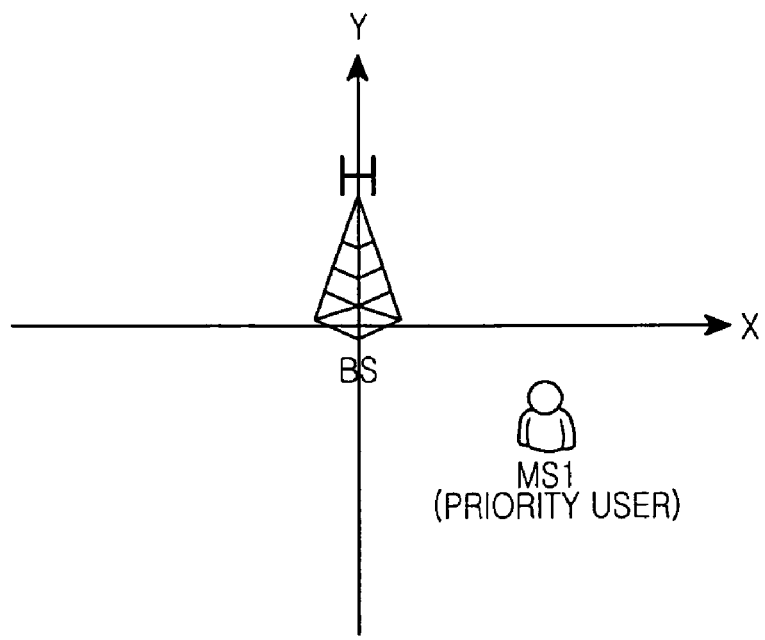
FIG. 11 illustrates graph showing simulation results in relation to the average data rate obtainable by the MS2 based on a location of the MRS according to an exemplary embodiment of the present invention.
Figure 11:
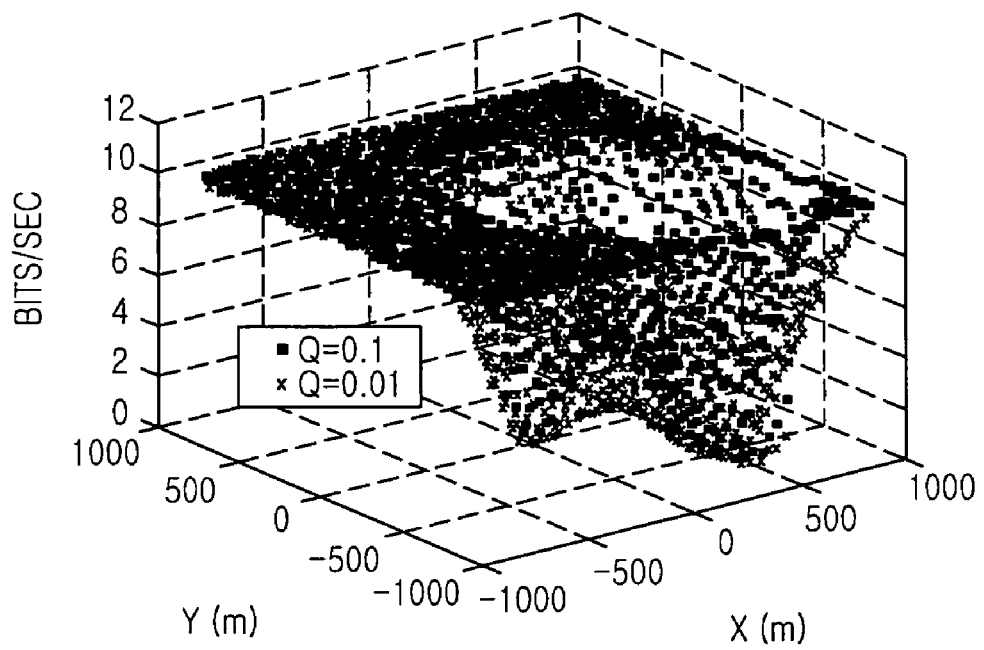

FIG. 11 is a graph showing simulation results in relation to the average data rate obtainable by the MS2 based on the location of the MRS according to an exemplary embodiment of the present invention. The environment under the simulation is defined as below:

frequency band=9.766 kHz
$P_{t,B}$=43 dBm, $P_{t,M}$=23 dBm, $SINR_{RM_2}$=30 dB
location of the MRS in the cell according to the Manhattan street model
Q=0.01, 0.1

Given a single cell, when every $P_{t,R-M1}$ determined in Equation 1 is used because of no inter-cell interference, the SINR of the MS within the MRS has the considerable value. Correspondingly, to acquire more practical results, the simulation controls to satisfy the condition of Equation 1 and to make $SINR_{RM_2}$=30 dB.

In FIG. 11, when the BS is positioned at the center of the cell and a single MS1 is stationary, as the MRS gets close to the center of the cell, the interference affected by the BS increases. Thus, the average data rate of the MS2 decreases. As the MRS and the MS1 are getting closer, the effect of the Q limitation increases and the average data rate of the MS2 decreases. In contrast, as the MS1 gets away from the BS, the average data rate obtainable by the MS2 increases.

As set forth above, in the environment where the cellular system and the MRS based system coexist, the apparatus and the method for the efficient resource allocation for the link between the MRS and the internal terminal can utilize the available resource in the system to the maximum while exerting the little interference less than the threshold on the cellular terminal, and enhance the overall frequency efficiency of the system.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. a resource allocation method for an internal terminal of a Mobile Relay Station (MRS) in an environment where a cellular system and an MRS based system coexist, the method comprising: determining a minimum transmit power value of the MRS, which enables the internal terminal to have a receive Signal to Interference and Noise Ratio (SINR) greater than a first threshold; determining a transmit power value of the MRS by taking into account the determined minimum transmit power value; determining a transmit power value of the MRS per cellular terminal, which is transmittable at maximum while exerting interference less than a second threshold on a corresponding cellular terminal; searching one or more cellular terminals having the maximum transmittable transmit power value determined per cellular terminal greater than the transmit power value determined by taking into account the minimum transmit power value; and borrowing and allocating a resource allocated to the searched cellular terminal to the internal terminal, wherein the maximum transmittable transmit power value of the MRS per cellular terminal is determined to meet a condition of the following equation:

$$P_{t,R-M1} \leq \min\left\{\frac{P_{t,M1}}{SNR_{r,M1R}}Q, P_{t,R,max}\right\}$$

where $P_{t,R-M1}$ denotes a maximum transmittable transmit power value of the MRS per cellular terminal, $SNR_{r,M1R}$ denotes an uplink receive Signal to Noise Ratio (SNR) of the corresponding cellular terminal, $P_{t,M1}$ denotes a transmit power of the corresponding cellular terminal, Q denotes an interference allowance of the corresponding cellular terminal, and $P_{t,R,max}$ denotes the maximum transmittable transmit power value of the MRS.

2. The resource allocation method of claim 1, wherein the transmit power value of the MRS is determined to a value between the determined minimum transmit power value and a maximum transmit power value transmittable by the MRS.

3. the resource allocation method of claim 1, wherein the SNR is determined by detecting a signal transmitted from the corresponding cellular terminal to a Base Station (BS) in an uplink.

4. the resource allocation method of claim 1, wherein the transmit power is obtained by receiving an uplink registration message transmitted from the corresponding cellular terminal by selecting a code based on a transmit power magnitude in an uplink registration interval to the MRS, by receiving a code indicative of a transmit power over a control channel when the corresponding cellular terminal transmits uplink data, by assuming that a transmit power of the corresponding cellular terminal is a minimum transmit power, or by sensing a signal transmitted from the corresponding cellular terminal to the BS in an uplink and detecting a code indicative of a transmit power from the sensed signal.

5. The resource allocation method of claim 1, further comprising, after searching of the cellular terminal:
determining an average data rate of the internal terminal obtainable by borrowing and allocating the resource of the searched cellular terminal to the internal terminal; and requesting to approve the borrowing and the allocation of the resource of the searched cellular terminal to the internal terminal by sending the determined average data rate of the internal terminal and an identifier of the searched cellular terminal.

6. The resource allocation method of claim 5, further comprising:
when receiving an acknowledgement response that approves the borrowing and the allocation of the resource of the searched cellular terminal to the internal terminal, from the BS, receiving a MAP from the BS; and
locating the resource allocated from the BS to the searched cellular terminal by analyzing the received MAP,
wherein the MAP includes resource allocation information.

7. The resource allocation method of claim 1, further comprising, after borrowing and allocating of the resource:
generating a MAP containing the location of the resource borrowed and allocated to the internal terminal and sending the MAP to the internal terminal; and
transmitting data to the internal terminal using the borrowed and allocated resource,
wherein the MAP includes resource allocation information.

8. a resource allocation apparatus for an internal terminal of a Mobile Relay Station (MRS) in an environment where a cellular system and an MRS based system coexist, the apparatus comprising: a cellular terminal selector configured to determine a minimum transmit power value of the MRS, which enables the internal terminal to have a receive Signal to Interference and Noise Ratio (SINR) greater than a first threshold, determine a transmit power value of the MRS by taking into account the determined minimum transmit power value, determine a transmit power value of the MRS per cellular terminal, which is transmittable at maximum while exerting interference less than a second threshold on a corresponding cellular terminal, and search one or more cellular terminals having the maximum transmittable transmit power value determined per cellular terminal greater than the transmit power value determined by taking into account the minimum transmit power value; and a MAP generator configured to borrow and allocate a resource allocated to the searched cellular terminal to the internal terminal, wherein a MAP includes resource allocation information, wherein the maximum transmittable transmit power value of the MRS per cellular terminal is determined to meet a condition of the following equation:

$$P_{t,R-M1} \le \min\left\{\frac{P_{t,M1}}{SNR_{r,M1R}}Q, P_{t,R,max}\right\}$$

where $P_{t,R-M1}$ denotes a maximum transmittable transmit power value of the MRS per cellular terminal, $SNR_{r,M1R}$ denotes an uplink receive Signal to Noise Ratio (SNR) of the corresponding cellular terminal, $P_{t,M1}$ denotes a transmit power of the corresponding cellular terminal, Q denotes an interference allowance of the corresponding cellular terminal, and $P_{t,R,max}$ denotes the maximum transmittable transmit power value of the MRS.

9. The resource allocation apparatus of claim 8, wherein the cellular terminal selector determines the transmit power value of the MRS to a value between the determined minimum transmit power value and a maximum transmit power value transmittable by the MRS.

10. the resource allocation apparatus of claim 8, further comprising: an SNR determiner configured to determine the SNR by detecting a signal transmitted from the corresponding cellular terminal to a Base Station (BS) in an uplink.

11. the resource allocation apparatus of claim 8, further comprising: a code detector configured to acquire the transmit power by receiving an uplink registration message transmitted from the corresponding cellular terminal by selecting a code based on a transmit power magnitude in an uplink registration interval to the MRS, by receiving a code indicative of a transmit power over a control channel when the corresponding cellular terminal transmits uplink data, by assuming that a transmit power of the corresponding cellular terminal is a minimum transmit power, or by sensing a signal transmitted from the corresponding cellular terminal to the BS in an uplink and detecting a code indicative of a transmit power from the sensed signal.

12. The resource allocation apparatus of claim 8, further comprising:
an internal terminal data rate determiner configured to determine an average data rate of the internal terminal obtainable by borrowing and allocating the resource of the searched cellular terminal to the internal terminal; and
a resource borrowing and allocation approval request transmitter configured to request approval of the borrowing and the allocation of the resource of the searched cellular terminal to the internal terminal by sending the determined average data rate of the internal terminal and an identifier of the searched cellular terminal.

13. The resource allocation apparatus of claim 12, further comprising:
a resource borrowing and allocation response receiver configured to receive a response for the borrowing and allocation approval request from the BS; and
a MAP analyzer configured to receive a MAP from the BS and locate the resource allocated from the BS to the searched cellular by analyzing the received MAP when the received response approves the borrowing and the allocation.

14. The resource allocation apparatus of claim 8, wherein the MAP generator is configured to generate a MAP containing the location of the resource borrowed and allocated to the internal terminal and send the MAP to the internal terminal.

* * * * *